United States Patent [19]
Straüven

[11] 3,976,533
[45] Aug. 24, 1976

[54] APPARATUS FOR BONDING PAPER OR FOIL WEBS ON SUBSTRATES

[75] Inventor: Kürt Straüven, Bonn, Germany

[73] Assignee: Wasser-Sand-Forschungs-und Vertriebsgesellschaft mbH, Bonn, Germany

[22] Filed: July 17, 1974

[21] Appl. No.: 489,165

[30] Foreign Application Priority Data

July 23, 1973 Germany ........................ 2337429

[52] U.S. Cl. ........................ 156/497; 156/498; 156/499; 156/574; 156/579

[51] Int. Cl.² ........................ B32B 35/00; C09J 7/00

[58] Field of Search ........... 156/497, 498, 499, 574, 156/576, 577, 578, 579, 311

[56] References Cited

UNITED STATES PATENTS

| | | | |
|---|---|---|---|
| 1,257,315 | 2/1918 | Chartier | 156/576 |
| 1,274,040 | 7/1918 | Hitchcock | 156/577 |
| 2,123,415 | 7/1938 | Gorbatenko | 156/499 |
| 2,235,704 | 3/1941 | Gorbatenko et al. | 156/499 |
| 2,372,737 | 4/1945 | Phillips | 156/574 |
| 2,387,631 | 10/1945 | Weir | 156/311 |
| 3,547,742 | 12/1920 | Cottrell | 156/311 |

*Primary Examiner*—Caleb Weston
*Attorney, Agent, or Firm*—Edwin E. Greigg

[57] ABSTRACT

An apparatus for bonding paper or foil webs to substrate surfaces. In particular, the apparatus is to be used for applying wall-paper of the type which is provided with an adhesive backing material consisting, for example, of polyvinyl acetate. In use, the apparatus is pressed against the positioned wall-paper and is moved over it. It includes a heater which softens the adhesive material, a roller or resilient strip which presses the wall-paper against the substrate surface and a cooler which cools and solidifies the adhesive backing material.

10 Claims, 5 Drawing Figures

FIG. 1
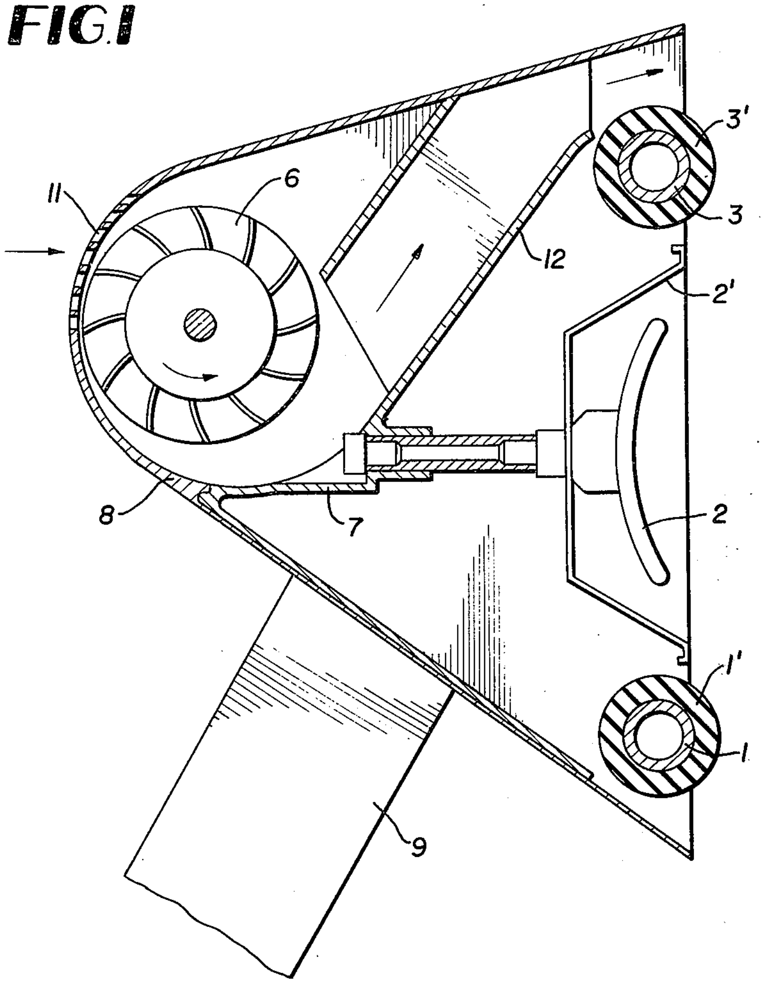
FIG. 2
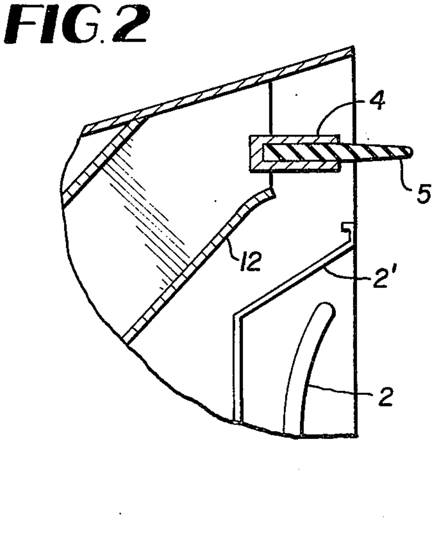
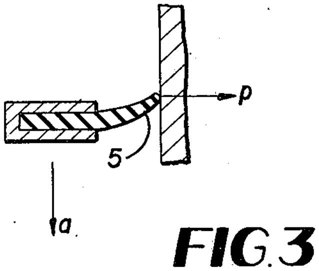
FIG. 3

FIG. 4
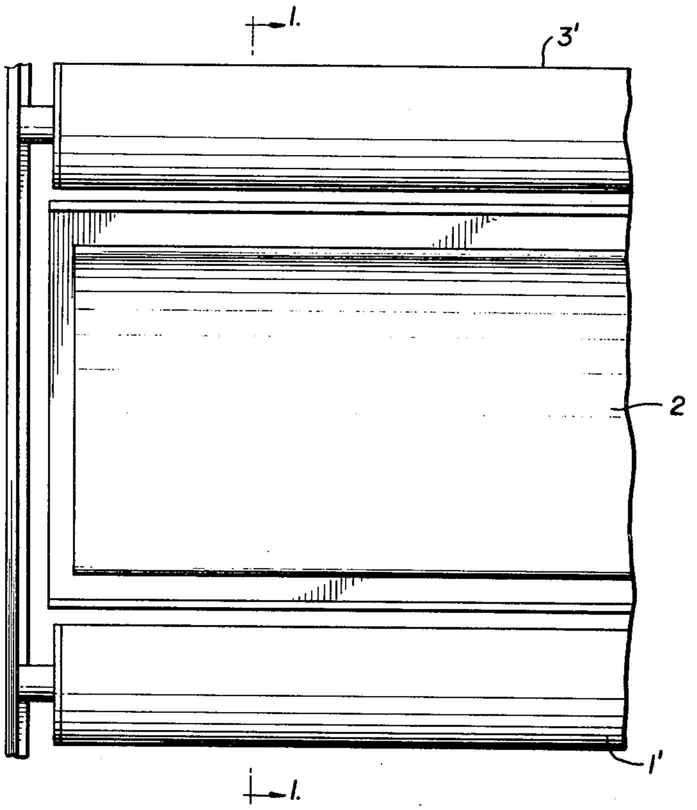
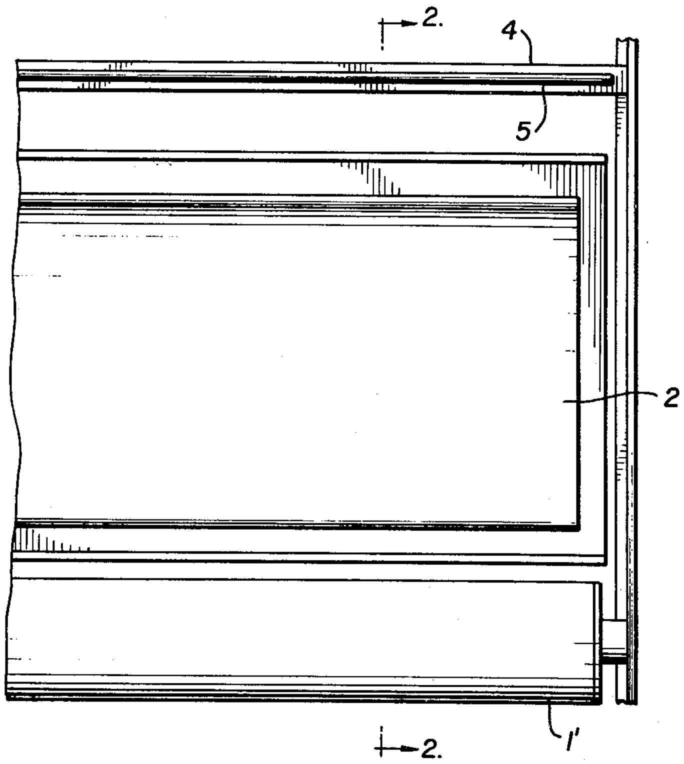
FIG. 5

APPARATUS FOR BONDING PAPER OR FOIL WEBS ON SUBSTRATES

BACKGROUND OF THE INVENTION

A known process for the manufacture of wall-paper or the like includes the step of covering the back side of the wall-paper with a non-transfering adhesive material consisting of a high polymer polyvinyl acetate inseparably applied to the back surface of the wall-paper using heat and pressure. After a required colloidal process the material is subjected to freezing temperatures where the chemical process is stopped and stabilized and where the wall-paper is dried.

After positioning this dry wall-paper on its intended surface, it is bonded to the substrate surface in that the adhesive layer is first subjected to the influence of hot air for the purpose of causing the extrusion of the binding material from the adhesive layer. The wall-paper is then pressed against the substrate surface and is finally subjected to the influence of a flow of cooling air for the purpose of solidifying and rigidizing the adhesive material.

OBJECT AND SUMMARY OF THE INVENTION

It is an object of the present invention to provide an apparatus for installing wall-paper of the type described above. The apparatus must continuously smooth out the adhesive paper or foil webs after they have been properly positioned, heat them to the activation temperature of the adhesive material, press them against the substrate by appropriate pressure means and, finally, cool the adhesive material.

This object is achieved by the new apparatus in that it is provided with an elastic element for smoothing the strip or web, and this element may have the form of a roller covered with an elastic coating or else may be an elastic bar. The apparatus further includes a supplementary heat source, for example a hot air blower, or an infra-red surface heater or a heated elastic contact strip. The cooling element is suitably a radial flow blower. The elastic bar is advantageously mounted in a frame and is made adjustable in a direction perpendicular to the web.

The apparatus according to the invention is represented in the drawing and is explained in detail below.

BRIEF DESCRIPTION OF THE DRAWING

FIG. 1 is a diagram of the longitudinal crosssection of the apparatus according to the invention;

FIG. 2 represents a section along the line 2—2 in FIG. 5;

FIG. 3 is a diagram of a flexible bar according to FIG. 2 in an operative flexed position;

FIG. 4 is a side elevational view of an embodiment of the apparatus with two rollers; and FIG. 5 is a side elevational view of another exemplary embodiment which employs a flexible bar.

DESCRIPTION AND OPERATION OF THE PREFERRED EMBODIMENTS

In FIG. 1, a roller is shown which holds down the paper web and smoothes it on its substrate. The roller 1 has an elastic covering or coating 1'. A heater serves for the activation of the bonding layer present on the back side of the paper web. Any heating unit is suitable for this purpose which is capable of producing the required activation temperature on the rear of the web in the shortest possible time by employing either convection (a hot air blower) or radiation (for example an infra-red radiator). The heater should be a surface-distributed source of heat. In the apparatus according to the invention, this purpose is achieved by using an infra-red surface radiator 2 housed in a shield 2'. The control of the temperature within the bonding layer is achieved by changing the speed of advance of the apparatus, and hence also of the heating source, over the web. The distance between the heating source and the surface of the wall-paper must be determined according to the radiated intensity distribution. When the wall-paper has achieved the proper temperature, it is continuously pressed against the substrate wall and bonded thereto. This purpose is achieved by a second roller 3 with an elastic covering or coating 3' (shore hardness approximately 30–40) or alternatively by a bar 5, made of a flexible and wear-proof material and tensioned longitudinally in a metal frame 4. The bar 5 must have sufficient rigidity to achieve the required contact pressure and the top edge surface of the bar must be such that no damage occurs in the surface of the wall-paper web. The separation of the bar from the web surface is adjustable so that different contact pressures may be achieved. The bar 5 and the holder 4 are represented in FIG. 2; FIG. 3 shows the bar 5 in its operative, flexed position. When the bar 5 is moved over the web 10, parallel to the web surface, the bending of the bar produces the contact pressure p. Immediately after bonding of the web to the wall, the bonded web is cooled below the activation temperature of the adhesive layer. This is done by blowing air in a surface-distributed manner both on the contact roller 3 or on the bar 5 and also on the part of the bonded web which lies immediately behind these elements as seen in direction of motion. The required cooling air comes from a blower 6 of suitable construction, e.g., a radial blower. The blower 6 draws in air through an opening 11 in the housing 8 and directs it through a tunnel 12 as shown. The contact roller 3 or the bar 5 are cooled in such a way that the cooling effect on the side facing the heater is achieved substantially by a secondary air stream. This prevents the premature cooling of the adhesive layer prior to the application of the bonding pressure.

The apparatus is so constructed that it can easily be operated by hand. When it is used on vertical walls, the bonding of the webs progresses from top to bottom. The parts 1–6 are installed on a chassis 7 consisting of glass-fiber reinforced, thermoplastic, synthetic material and are enclosed in a housing 8. The handle 9 serves for manipulating the apparatus FIG. 4 shows one exemplary form of the apparatus including a roller 3 and FIG. 5 shows another exemplary form of the apparatus employing a flexible bar 5 within a frame 4, both in a frontal view. The width of the apparatus is suitably the same as that of the web to be bonded. If the job includes corners or recesses, then the bonding in these locations is performed with a small heating source of sufficient power and a contact roller.

What is claimed is:

1. An apparatus for adhesive bonding of paper or foil webs to a substrate, comprising:

a. a housing;

b. an elastic element mounted within said housing and extending substantially parallel to said web for smoothing the web on its substrate;

c. heating means mounted within said housing so as to supply heat to the web material, especially to the adhesive layer on the back side thereof; and d. a further elastic element mounted within said housing and extending substantially parallel to said web for bonding the web on its substrate after the application of heat; and e. cooling means mounted within said housing for cooling the activated adhesive layer, wherein the housing has an open end which serves as an access opening for the application of heat and cooling to the web and for the engagement of both elastic elements to the web, and wherein both the heating means and the cooling means include shielding structure to insure that the heating medium and the cooling medium do not interfere during operation of the apparatus.

2. An apparatus as defined in claim 1, wherein each elastic element comprises a roller covered with a layer of elastic material.

3. An apparatus as defined in claim 2, wherein said cooling means is a radial blower.

4. An apparatus as defined in claim 3, wherein said heating means is a hot-air blower.

5. An apparatus as defined in claim 3, wherein said heating means is an infra-red surface radiator.

6. An apparatus as defined in claim 1, wherein said elastic element comprises an elastic bar.

7. An apparatus as defined in claim 6, further comprising a frame mounted within said housing, wherein said elastic bar which bonds the web on its substrate is mounted to said frame.

8. An apparatus as defined in claim 6, wherein said cooling means is a radial blower.

9. An apparatus as defined in claim 8, wherein said heating means is an infra-red surface radiator.

10. An apparatus as defined in claim 8, wherein said heating means is a hot-air blower.

* * * * *